US011913966B2

(12) United States Patent
Sakairi et al.

(10) Patent No.: US 11,913,966 B2
(45) Date of Patent: Feb. 27, 2024

(54) AUTOMATED ANALYSIS DEVICE

(71) Applicant: Hitachi High-Tech Corporation, Tokyo (JP)

(72) Inventors: Susumu Sakairi, Tokyo (JP); Takenori Okusa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 254 days.

(21) Appl. No.: 16/756,784

(22) PCT Filed: Jan. 21, 2019

(86) PCT No.: PCT/JP2019/001602
§ 371 (c)(1),
(2) Date: Apr. 16, 2020

(87) PCT Pub. No.: WO2019/167468
PCT Pub. Date: Sep. 6, 2019

(65) Prior Publication Data
US 2020/0241026 A1     Jul. 30, 2020

(30) Foreign Application Priority Data

Feb. 28, 2018  (JP) .................................. 2018-034583

(51) Int. Cl.
*G01N 35/02*     (2006.01)
*G01N 35/10*     (2006.01)
(Continued)

(52) U.S. Cl.
CPC ............ *G01N 35/025* (2013.01); *B01L 3/508* (2013.01); *G01N 35/1079* (2013.01); *G01N 2035/00356* (2013.01)

(58) Field of Classification Search
CPC .. B01L 3/508; G01N 35/025; G01N 35/1002; G01N 35/1079; G01N 35/1011;
(Continued)

(56) References Cited

U.S. PATENT DOCUMENTS

| 5,051,238 A | 9/1991 | Umetsu et al. |
| 5,104,808 A * | 4/1992 | Laska ................ G01N 35/0098 422/50 |

(Continued)

FOREIGN PATENT DOCUMENTS

| CN | 102597785 A | 7/2012 |
| CN | 203275275 U | 11/2013 |

(Continued)

OTHER PUBLICATIONS

International Search Report (PCT/ISA/210) issued in PCT Application No. PCT/JP2019/001602 dated Mar. 19, 2019 with English translation (four (4) pages).

(Continued)

*Primary Examiner* — Matthew D Krcha
*Assistant Examiner* — Austin Q Le
(74) *Attorney, Agent, or Firm* — Crowell & Moring LLP (57) ABSTRACT

When an automatic analysis apparatus has a mechanism that performs an operation of an arcuate trajectory to access a plurality of positions arranged on a straight line, an arc and a straight line cannot coincide with each other. Thus position adjustment is required to minimize the deviation between the arc and the straight line. An automatic analysis apparatus according to the invention includes a reagent disk which accommodates a plurality of reagent bottles in each of which a plurality of suction ports are arranged along a center line, and which rotates around a central axis to transport a reagent bottle to a desired position; and a reagent dispensing mechanism which rotates around a rotation axis to suck a reagent (Continued)

from the reagent bottle at a predetermined suction position on the reagent disk, in which the reagent disk is provided with, at least one mounting position of the reagent bottle on the reagent disk, first and second marks sandwiching the mounting position of the reagent bottle.

2 Claims, 8 Drawing Sheets

(51) Int. Cl.
  *B01L 3/00* (2006.01)
  *G01N 35/00* (2006.01)
(58) Field of Classification Search
  CPC . G01N 2035/00356; G01N 2035/0443; G01N 2035/0491
  See application file for complete search history.

(56) References Cited

U.S. PATENT DOCUMENTS

| | | | | |
|---|---|---|---|---|
| 5,314,825 | A * | 5/1994 | Weyrauch | G01N 35/1079 422/63 |
| 5,807,523 | A * | 9/1998 | Watts | G01N 35/0092 366/168.1 |
| 9,678,094 | B2 | 6/2017 | Brade et al. | |
| 2004/0245275 | A1 | 12/2004 | Yanami et al. | |
| 2005/0084426 | A1 * | 4/2005 | Mimura | G01N 35/00663 422/400 |
| 2010/0028215 | A1 | 2/2010 | Schenk | |
| 2012/0301359 | A1 * | 11/2012 | Kraemer | G01N 35/04 422/64 |
| 2015/0037211 | A1 | 2/2015 | Wang et al. | |
| 2016/0124008 | A1 | 5/2016 | Kraemer et al. | |

FOREIGN PATENT DOCUMENTS

| | | | |
|---|---|---|---|
| EP | 2 711 716 A1 | 3/2014 | |
| JP | 2-59670 A | 2/1990 | |
| JP | 3972012 B2 | 9/2007 | |
| JP | 2010-509144 A | 3/2010 | |
| JP | 2010-249601 A | 11/2010 | |
| JP | 2014-206381 A | 10/2014 | |
| JP | 5854647 B2 | 2/2016 | |
| WO | WO-2016203856 A1 * | 12/2016 | G01N 35/00 |

OTHER PUBLICATIONS

Japanese-language Written Opinion (PCT/ISA/237) issued in PCT Application No. PCT/JP2019/001602 dated Mar. 19, 2019 (six (6) pages).

Extended European Search Report issued in European Application No. 19760906.8 dated Nov. 5, 2021 (12 pages).

Chinese-language Office Action issued in Chinese Application No. 201980005331.5 dated Mar. 1, 2023 with partial English translation (10 pages).

* cited by examiner

AUTOMATED ANALYSIS DEVICE

TECHNICAL FIELD

The present invention relates to an automatic analysis apparatus.

BACKGROUND ART

In an automatic analysis apparatus for detecting a measurement object contained in a sample, the sample and a reagent are reacted in a reaction vessel. At the time, there is a step (dispensing step) of sucking the reagent from a reagent vessel held at a predetermined position by using a reagent probe, and discharging the sucked reagent to the reaction vessel held at another predetermined position. From a viewpoint of reliability of the apparatus, it is desirable that the reagent probe and a center of a suction port of the reagent vessel coincide with each other as much as possible during the suction of the reagent, and the reagent probe and a center of the reaction vessel coincide with each other as much as possible during the discharging of the reagent. Therefore, it is necessary to perform position adjustment on a reagent dispensing mechanism that sucks and discharges the reagent, and the reagent vessel and the reaction vessel.

PTL 1 discloses an example in which a metal pin is provided at a fixed position in a reagent rack in order to adjust a suction position of a reagent dispensing arm. A change in capacitance between a probe tip of the reagent dispensing arm and the pin is detected to search a position of the pin, and a position indicated by information stored in advance and indicating a relative positional relationship between the pin and a port of the reagent vessel is determined as the suction position based on the detected position of the pin.

CITATION LIST

Patent Literature

PTL 1: JP-A-2010-249601

SUMMARY OF INVENTION

Technical Problem

When an automatic analysis apparatus has a mechanism that performs an operation of an arcuate trajectory to access a plurality of positions arranged on a straight line, or a mechanism that performs an operation of a linear trajectory to access a plurality of positions arranged on an arc, the arc and the straight line cannot coincide with each other. Therefore, position adjustment is required to minimize a deviation between the arc and the straight line.

Solution to Problem

An automatic analysis apparatus according to an embodiment of the invention includes: a reagent disk which accommodates a plurality of reagent bottles in each of which a plurality of suction ports are arranged along a center line, and which rotates around a central axis in a circumferential direction to transport a reagent bottle to a desired position; and a reagent dispensing mechanism which rotates around a rotation axis to suck a reagent from the reagent bottle at a predetermined suction position on the reagent disk, in which the reagent disk is provided with, at at least one mounting position of the reagent bottle on the reagent disk, first and second marks sandwiching the mounting position of the reagent bottle, the reagent dispensing mechanism is arranged such that an arcuate trajectory of the reagent dispensing mechanism passes above the first and second marks, and the reagent dispensing mechanism accesses any one of the plurality of suction ports of the reagent bottle transported to the predetermined suction position by the rotation of the reagent disk to perform reagent suction.

The automatic analysis apparatus according to the embodiment of the invention further includes: an incubator which accommodates reaction vessels at a plurality of positions arranged on an arc, and which rotates around a central axis in a circumferential direction to transport a reagent bottle to a desired position; and a reagent dispensing mechanism which moves on a linear trajectory to discharge a reagent to a plurality of reaction vessels at a plurality of discharging positions on the incubator, in which the incubator is provided with at least one set of first and second marks sandwiching the plurality of discharging positions, the reagent dispensing mechanism is arranged such that a linear trajectory of the reagent dispensing mechanism passes above the first and second marks, and the reagent dispensing mechanism accesses any one of the plurality of reaction vessels transported to the plurality of discharging positions by the rotation of the incubator to perform reagent discharging.

Other problems and novel features will be apparent from a description of the description and the accompanying drawings.

Advantageous Effect

The position adjustment in consideration of a combination of an arc and a straight line can be easily performed.

DESCRIPTION OF EMBODIMENTS

An automatic analysis apparatus has a mechanism that performs an operation of an arcuate trajectory to access a plurality of positions arranged on a straight line (a first embodiment), or a mechanism that performs an operation of a linear trajectory to access a plurality of positions arranged on an arc (a second embodiment).

First Embodiment

Figure 1A:
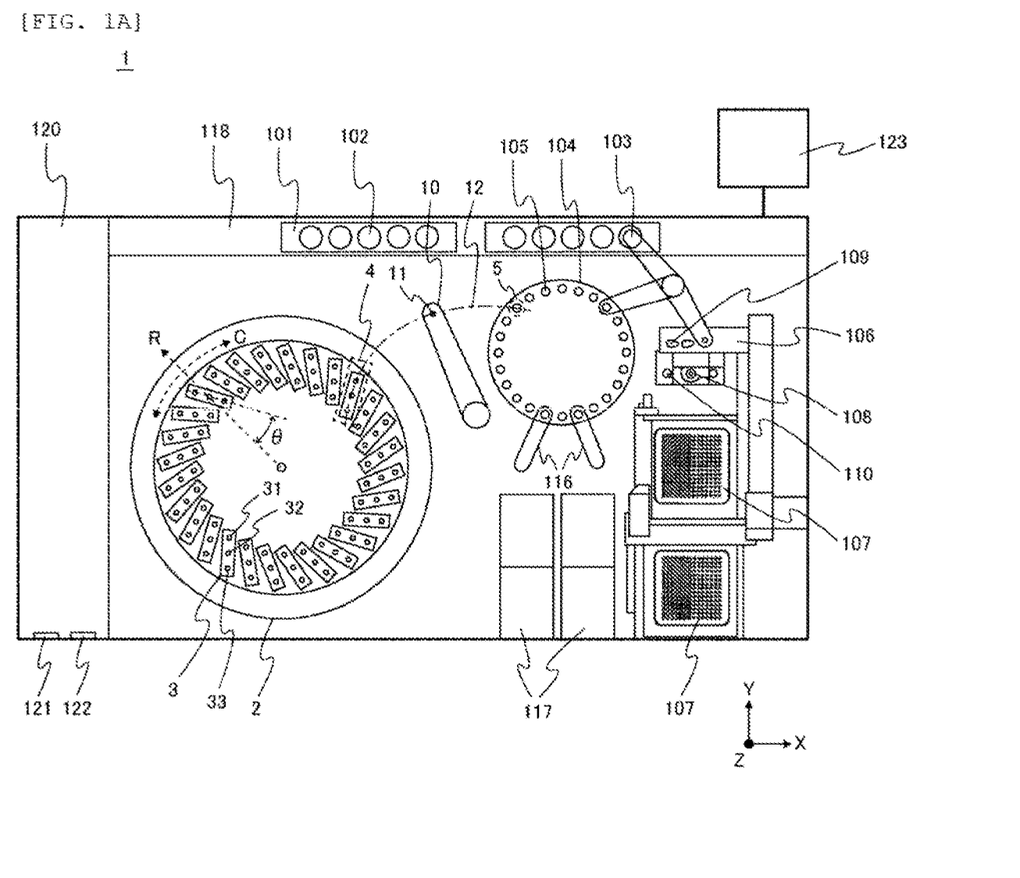
FIG. 1A is a diagram showing an overall configuration of an automatic analysis apparatus.

FIG. 1A shows an overall configuration of an automatic analysis apparatus 1. FIG. 1A shows a plane configuration of the automatic analysis apparatus 1 provided on an XY plane, which is a horizontal plane, when viewed from above (Z direction). An X direction and a Y direction are directions orthogonal to each other forming a horizontal plane, and here, the X direction corresponds to a lateral width direction of the apparatus 1, and the Y direction corresponds to a vertical width direction of the apparatus 1. The Z direction is a vertical direction perpendicular to the X direction and the Y direction, and corresponds to a height direction of the apparatus 1. In addition, a radial direction R of a reagent disk 2 and a circumferential direction C of the reagent disk 2 are shown in the horizontal plane.

The automatic analysis apparatus 1 includes a control computer 123, a rack transport unit 120, a rack transport line 118, a sample dispensing mechanism 103, an incubator 104, a transport mechanism 106, a holding member 107, a stirring mechanism 108, a disposal hole 109, the reagent disk 2, a reagent dispensing mechanism 10, a reaction vessel transport mechanism 116, and a detection unit 117.

The control computer 123 controls each mechanism based on analysis request information of the automatic analysis apparatus 1 to achieve each step for analysis. Steps include a dispensing step and the like. The control computer 123 also provides an interface for a user.

A sample to be analyzed by the automatic analysis apparatus 1 is accommodated in a sample vessel 102, and the sample vessel 102 is carried into the automatic analysis apparatus 1 in a state of being installed in a rack 101. The rack transport unit 120 is a mechanism for carrying in and carrying out the rack 101 between an outside and the automatic analysis apparatus 1. The rack transport unit 120 includes a power supply instruction unit 121 and a power off instruction unit 122 of the automatic analysis apparatus 1. The power supply instruction unit 121 and the power off instruction unit 122 are buttons for an operator (a user who operates the automatic analysis apparatus 1) to perform an input operation. A display unit of the control computer 123 may include an input unit corresponding to the power supply instruction unit 121 and the power off instruction unit 122.

The rack 101 carried in by the rack transport unit 120 is moved to a sample dispensing position in the vicinity of the sample dispensing mechanism 103 by the rack transport line 118. A plurality of reaction vessels 105 may be provided in a circumferential portion of the incubator 104, and a rotation motion of moving each reaction vessel 105 provided in the circumferential direction to a predetermined position may be performed.

The transport mechanism 106 is movable in each direction of three axes X, Y, and Z. The transport mechanism 106 is a mechanism for transporting a sample dispensing tip and the reaction vessel 105 and moves within predetermined position ranges of the holding member 107 for holding the sample dispensing tip and the reaction vessel 105, the stirring mechanism 108 for stirring the reaction vessel 105, the disposal hole 109 for discarding the sample dispensing tip or the reaction vessel 105, a sample dispensing tip mounting position 110, and the incubator 104.

The holding member 107 holds a plurality of unused reaction vessels and unused sample dispensing tips. First, the transport mechanism 106 moves to above the holding member 107, moves down, holds an unused reaction vessel 105, moves up, moves to above a predetermined position on the incubator 104, and then moves down to place the reaction vessel 105 at a predetermined position on the incubator 104.

Then, the transport mechanism 106 again moves to above the holding member 107, moves down, holds an unused sample dispensing tip, moves up, moves to above the sample dispensing tip mounting position 110, and then moves down to place the sample dispensing tip at the sample dispensing tip mounting position 110. The sample dispensing tip is mounted to a tip of a probe (nozzle) when the sample dispensing mechanism 103 dispenses the sample in order to prevent contamination, and is discarded when dispensing of the sample is completed.

The sample dispensing mechanism 103 can rotate in a horizontal plane and move up and down in the vertical direction (Z direction). The sample dispensing mechanism 103 moves to above the sample dispensing tip mounting position 110 by rotation, moves down, and presses and mounts the sample dispensing tip into the tip of the nozzle. The sample dispensing mechanism 103 having the sample dispensing tip mounted to the tip of the nozzle moves to above the sample vessel 102 placed on the transport rack 101, then moves down and sucks the sample held in the sample vessel 102 by a predetermined amount. The sample dispensing mechanism 103 with the sucked sample moves to above the incubator 104, then moves down and discharges the sample to the unused reaction vessel 105 held in the incubator 104. When the sample discharging is completed, the sample dispensing mechanism 103 moves to above the disposal hole 109, and discards the used sample dispensing tip from the disposal hole 109.

The reagent disk 2 has a disk shape, and can rotate. The reagent disk 2 is provided with a plurality of reagent bottles 3. The reagent disk 2 rotates around a central axis in the vertical direction in the horizontal plane. Accordingly, the reagent bottle 3 arranged on the reagent disk 2 moves in the circumferential direction C and is transported to a predetermined position corresponding to a step.

Figure 1B:
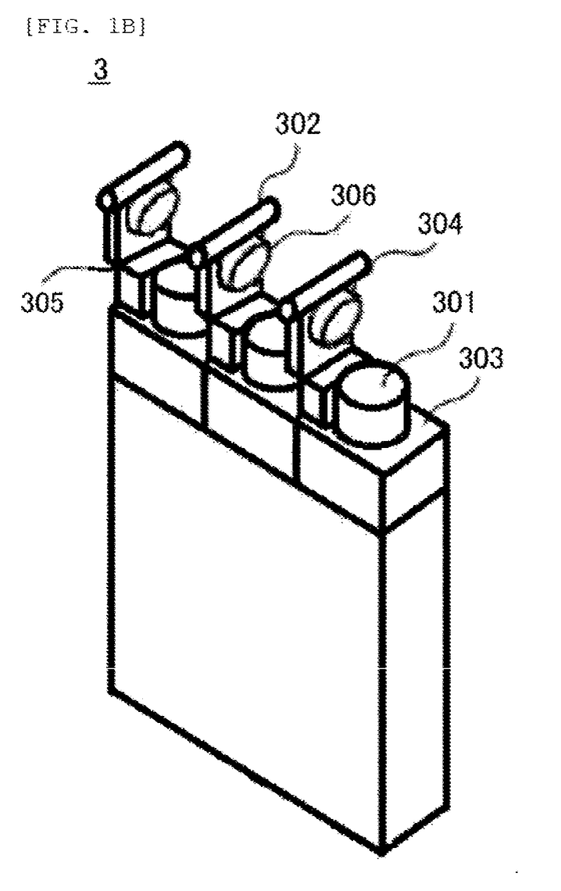
FIG. 1B is a schematic perspective view of a reagent bottle.

For example, a reagent bottle 3 having three vessel units as one set can be provided on the reagent disk 2. FIG. 1B shows a schematic perspective view of the reagent bottle 3. The number of the vessel units in the reagent bottle 3 may be plural, and is not limited to three. Each vessel unit includes a main body portion that accommodates a reagent, a suction port 301 that is accessible for the reagent, and a lid 302 that can seal the suction port 301. An entire outer shape of the reagent bottle 3 is a substantially rectangular parallelepiped shape having a shoulder portion 303, and three suction ports 301 are arranged on an upper side of the shoulder portion to protrude upward. In order to perform open and close operations by a reagent vessel lid opening and closing mechanism (not shown) of the automatic analysis apparatus, a protrusion 304 is provided at one end of the lid 302 and protrudes in a lateral direction of the reagent bottle 3. The lid 302 is rotatable about a hinge 305 as a rotation axis. The lid 302 is provided with a sealing member 306, and is closed by inserting the sealing member 306 into the suction port 301 to prevent evaporation or concentration change of the reagent. As shown in FIG. 1A, the automatic analysis apparatus 1 of the present embodiment is arranged such that a center line of the reagent bottle 3 has a predetermined angle $\theta$ ($\theta > 0$) relative to the radial direction R of the reagent disk 2 (here, referred to as "oblique arrangement"). By applying such an oblique arrangement of the reagent bottle, the reagent dispensing mechanism 10 can be provided such that the arcuate trajectory of the reagent dispensing mechanism 10 passes over a plurality of suction ports of one reagent bottle. In a case where the reagent bottles are radially arranged along a diameter of the reagent disk (θ=0) as in the related art, a diameter of the arcuate trajectory has to be increased in order to perform the access as described above, and it is difficult to perform a stable dispensing operation by the reagent dispensing mechanism 10. Therefore, the reagent dispensing mechanism is designed to access the reagent bottle at a different position for each suction port.

A cover (not shown) is provided on an upper portion of the reagent disk 2, so that intrusion of dust or the like is prevented, and a space including the reagent disk 2 is kept warm or cold at a predetermined temperature. That is, the space including the reagent disk 2 also functions as a warm storage and a cold storage. In the embodiment, it is desirable to provide an opening in the cover and to provide a reagent vessel lid opening and closing mechanism for the reagent dispensing mechanism 10 in a region 4 to access the reagent bottle 3. Accordingly, it is unnecessary to perform a rotation operation of the reagent disk between an opening and closing operation of the lid of the reagent vessel and a reagent sucking operation, and a time required for the dispensing step can be shortened.

The reagent dispensing mechanism 10 can rotate in the horizontal plane and move up and down in the vertical direction. The reagent dispensing mechanism 10 moves to above the region 4 (the opening of the cover) by rotation, then moves down, and immerses a tip of the probe (nozzle) in the reagent in the reagent bottle 3 whose lid is opened by the reagent vessel lid opening and closing mechanism to suck a predetermined amount of the reagent. Next, the reagent dispensing mechanism 10 moves up, moves to above a predetermined position 5 on the incubator 104 by rotation, and then discharges the reagent to the reaction vessel 105.

The reaction vessel 105 to which the sample and the reagent are discharged moves to a predetermined position by rotation of the incubator 104, and is transported to the reaction vessel stirring mechanism 108 by the transport mechanism 106. The reaction vessel stirring mechanism 108 stirs and mixes the sample and the reagent in the reaction vessel 105 by applying a rotation motion to the reaction vessel 105. Accordingly, a reaction liquid is generated in the reaction vessel 105.

The reaction vessel 105 in which the stirring is completed is returned to a predetermined position on the incubator 104 by the transport mechanism 106. The reaction vessel transport mechanism 116 transfers the reaction vessel 105 between the incubator 104 and the detection unit 117. The reaction vessel transport mechanism 116 holds the reaction vessel 105, moves up, and transports the reaction vessel 105 to the detection unit 117 by rotation. The reaction vessel 105 is analyzed in the detection unit 117. The reaction vessel 105 after a completion of the analysis is returned to the incubator 104 by the reaction vessel transport mechanism 116. Thereafter, the reaction vessel 105 moves to above the disposal hole 109 from the incubator 104 by the transport mechanism 106 and is discarded from the disposal hole.

The position 4 on the reagent disk 2 accessed by the reagent dispensing mechanism 10 and the discharging position 5 on the incubator 104 accessed by the reagent dispensing mechanism 10 are fixed, and are in a positional relationship shown in FIG. 1. First, the reagent disk 2 rotates to move the reagent bottle 3 containing the reagent to be sucked to the position 4. Subsequently, the reagent dispensing mechanism 10 rotates to access any one of suction ports 31, 32 and 33 of the reagent bottle 3, and sucks the reagent using a reagent probe 11. On the other hand, the incubator 104 also rotates, and the reaction vessel 105 for discharging the reagent is moved to the discharging position 5. Thereafter, the reagent dispensing mechanism 10 rotates to discharge the sucked reagent to the reaction vessel 105 at the discharging position 5.

Figure 2A:
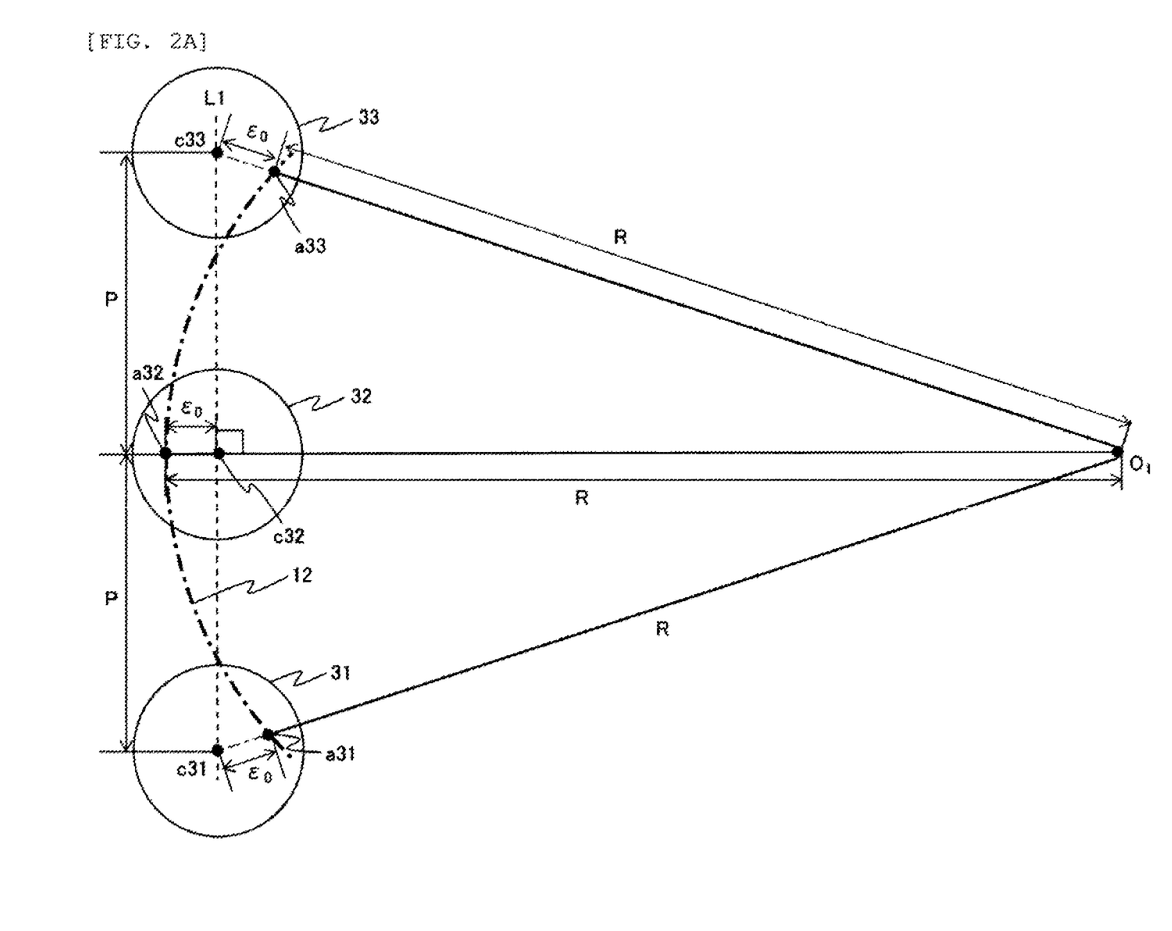
FIG. 2A is a view showing a positional relationship between an arcuate trajectory of a reagent dispensing mechanism and a plurality of suction ports of the reagent bottle.

FIG. 2A shows a positional relationship between an arcuate trajectory 12 of the reagent dispensing mechanism 10 and the three suction ports 31, 32 and 33 of the reagent bottle 3 positioned in the region 4 (however, the arcuate trajectory 12 is drawn by exaggeration for clarity in FIG. 2A). Here, the arcuate trajectory 12 of the reagent dispensing mechanism 10 refers to a trajectory which is drawn by the reagent probe (nozzle) 11 of the reagent dispensing mechanism 10 as the reagent dispensing mechanism rotates. Center positions c31, c32 and c33 of the suction ports of the reagent bottle 3 are arranged along a center line L1 with a distance P between two center positions. Therefore, as shown in FIG. 2A, by setting all deviation amounts ε between the arcuate trajectory 12 of the reagent dispensing mechanism 10 and the center position of each suction port to the same amount $\varepsilon_0$, a minimum deviation amount can be obtained. When a radius of the arcuate trajectory 12 of the reagent dispensing mechanism 10 is R (a distance between a rotation axis $O_1$ of the reagent dispensing mechanism 10 and the reagent probe 11), (Equation 1) is established based on the Pythagorean theorem, and (Equation 2) can be derived from transformation of (Equation 1). At the time, access positions of the reagent probe 11 to the suction ports 31, 32 and 33 are a31, a32 and a33, respectively.

$$P^2 + (R - \varepsilon_0)^2 = (R + \varepsilon_0)^2 \quad \text{(Equation 1)}$$

$$\varepsilon_0 = \frac{P^2}{4R} \quad \text{(Equation 2)}$$

Therefore, according to (Equation 2), in order to allow the deviation amount $\varepsilon_0$ to be as small as possible, the suction port pitch P may be set as small as possible, and the radius R of the arcuate trajectory 12 may be set as large as possible. However, settings of the suction port pitch P and the radius R are somewhat limited due to an apparatus size constraint, part fabrication, or a required amount of a reagent. It is necessary to set an appropriate value since a relationship of a size of the suction port of the reagent bottle 3, a thickness of the reagent probe 11 and the like also affect a clearance at a time when the reagent dispensing mechanism 10 accesses the reagent bottle.

For example, when the radius R of the arcuate trajectory 12 of the reagent dispensing mechanism 10 is 200 mm and the pitch P between the three suction ports is 26 mm, the deviation amount $\varepsilon_0$ between a center of the reagent probe 11 and the center of each of the suction ports 31, 32 and 33 of the reagent bottle is 0.845 mm according to (Equation 2). When the size of the suction port of the reagent bottle is ϕ12 mm and the thickness of the reagent probe 11 is ϕ3 mm, a clearance value d between the suction port and the reagent probe is (12/2)−(3/2)−0.845=3.655 mm (see FIG. 2B).

The reagent dispensing mechanism 10 is installed in a housing of the automatic analysis apparatus 1. As described above, the clearance between the suction port of the reagent bottle and the reagent probe is relatively small, and the suction port is arranged on a straight line, whereas the reagent dispensing mechanism 10 has an arcuate trajectory.

Therefore, for example, when an installation position of the reagent dispensing mechanism 10 is adjusted based on the suction port 32 shown in FIG. 2A and the deviation amount ε at the suction port 32 is adjusted to be smaller than $\varepsilon_0$, the deviation amounts ε at other suction ports are larger than $\varepsilon_0$. Therefore, the position adjustment of the reagent dispensing mechanism 10 is performed as follows.

Figure 3:
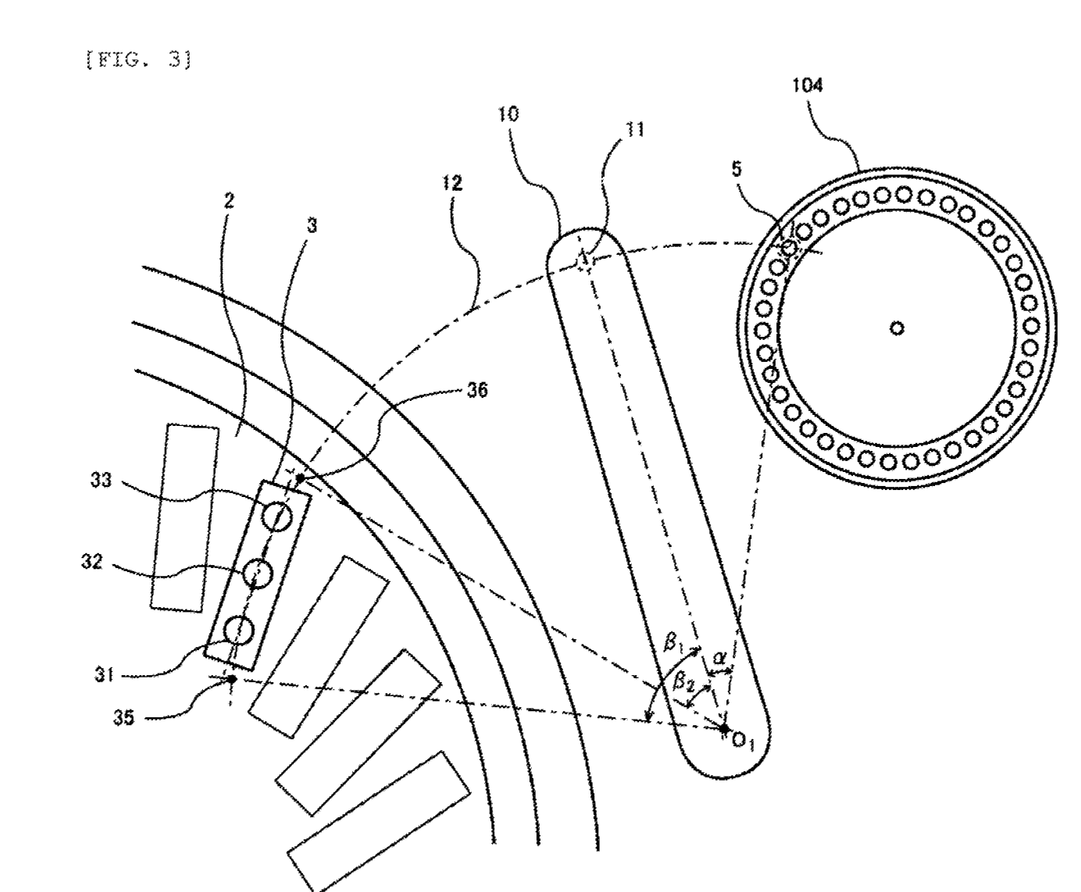
FIG. 3 is a view illustrating position adjustment of the reagent dispensing mechanism.

As shown in FIG. 3, on the reagent disk 2, marks 35 and 36 are provided on the arcuate trajectory 12 of the reagent dispensing mechanism 10 and in the vicinity outside both ends of the mounting position of the reagent bottle 3. The mark may only be provided to a mounting position on one reagent bottle in the reagent disk. Here, across the mounting position of the reagent bottle, the mark at a position close to the rotation axis of the reagent disk 2 is referred to as a first mark 35, and the mark at a position far from the rotation axis of the reagent disk 2 is referred to as a second mark 36. The reagent dispensing mechanism 10 is fixed to the housing of the automatic analysis apparatus such that the reagent probe 11 of the reagent dispensing mechanism 10 passes through three positions, that is, the first mark 35, the second mark 36, and the discharging position 5 (a center of the reaction vessel 105) on the incubator 104. The first mark 35 and the second mark 36 are protrusions or holes. Cylindrical protrusions or holes can be accurately and easily formed on the reagent disk by forming a reagent holding unit of the reagent disk using a resin and forming the protrusions or holes corresponding to the marks 35 and 36 in a mold. The positions on the reagent disk through which the arcuate trajectory of the reagent dispensing mechanism 10 passes may be indicated by printing or sealing, without being limited to protrusions or holes.

After the reagent dispensing mechanism 10 is installed such that the arcuate trajectory 12 of the reagent dispensing mechanism 10 passes through the three positions described above, the access position of the reagent probe 11 may be a more appropriate position by adjustment by using software. Specifically, the reagent dispensing mechanism 10 rotates to move toward an adjustment target position, and then moves down, a rotational movement amount that indicates a correct access position is obtained, and the rotational movement amount from an origin point, for example, is stored in a storage device of the control computer 123.

For the incubator 104, since only one point in the center of the reaction vessel 105 at the discharging position 5 is accessed, the rotational movement amount may be adjusted to match the position. For example, when an origin point position of the reagent probe 11 is in a state shown in FIG. 3, an angle α is stored as the rotational movement amount.

On the other hand, for the reagent disk 2, it is necessary to adjust access positions of the three suction ports of the reagent bottle 3 to the access positions a31, a32 and a33. Therefore, the adjustment is performed using the first mark 35 and the second mark 36. The reagent dispensing mechanism 10 rotates to move down with respect to each of the first mark 35 and the second mark 36, and rotational movement amounts $\beta_1$ and $\beta_2$ by which the reagent probe 11 moves right above the first mark 35 and the second mark 36 are obtained. Since a relationship between the first mark 35 and the second mark 36 and the mounting position of the reagent bottle 3 is fixed, rotational movement amounts to the three suction ports of the reagent bottle 3, that is, the access positions a31, a32 and a33, can be calculated based on the rotational movement amounts $\beta_1$ and $\beta_2$. The rotational movement amount to be stored may be a rotation angle, and may be information such as a rotational control amount for a motor since the reagent dispensing mechanism 10 is driven by, for example, a stepping motor.

Figure 2B:
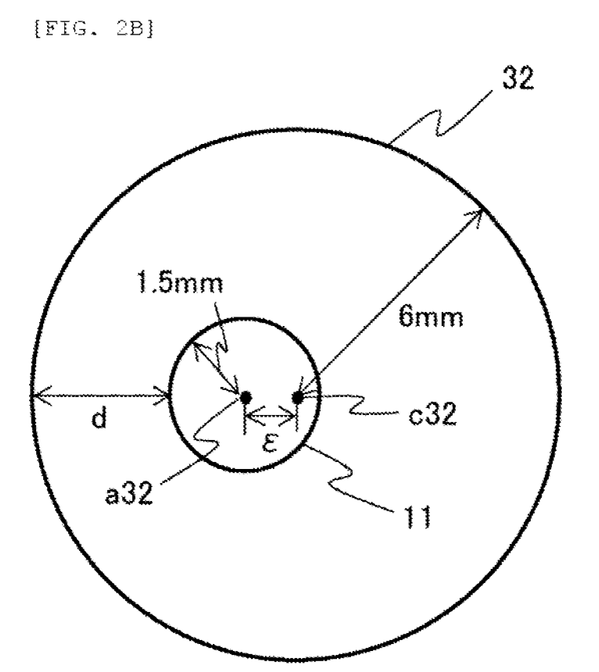
FIG. 2B is a diagram showing a clearance between the suction port and a reagent probe.

As a matter of course, the reagent dispensing mechanism 10 may rotate to move to each of the access positions a31, a32 and a33, move down, and adjust the rotational movement amount to match each of the access positions on the arcuate trajectory. However, as shown in FIG. 2A and FIG. 2B, since the access positions a31, a32 and a33 of the reagent bottle 3 are respectively slightly deviated from the center positions a31, a32 and a33 of the suction ports, there is a concern that a variation may easily occur caused by adjustment workers, and the number of adjustment places also increases by one.

The first embodiment has been described above by taking the reagent dispensing mechanism 10, the reagent bottle 3 obliquely arranged on the reagent disk 2, the incubator 104, and the reaction vessel 105 as an example. However, this is an example, and a mechanism that performs an operation of a wide arcuate trajectory is applicable to an apparatus that accesses a plurality of positions arranged on a straight line.

Second Embodiment

Figure 4:
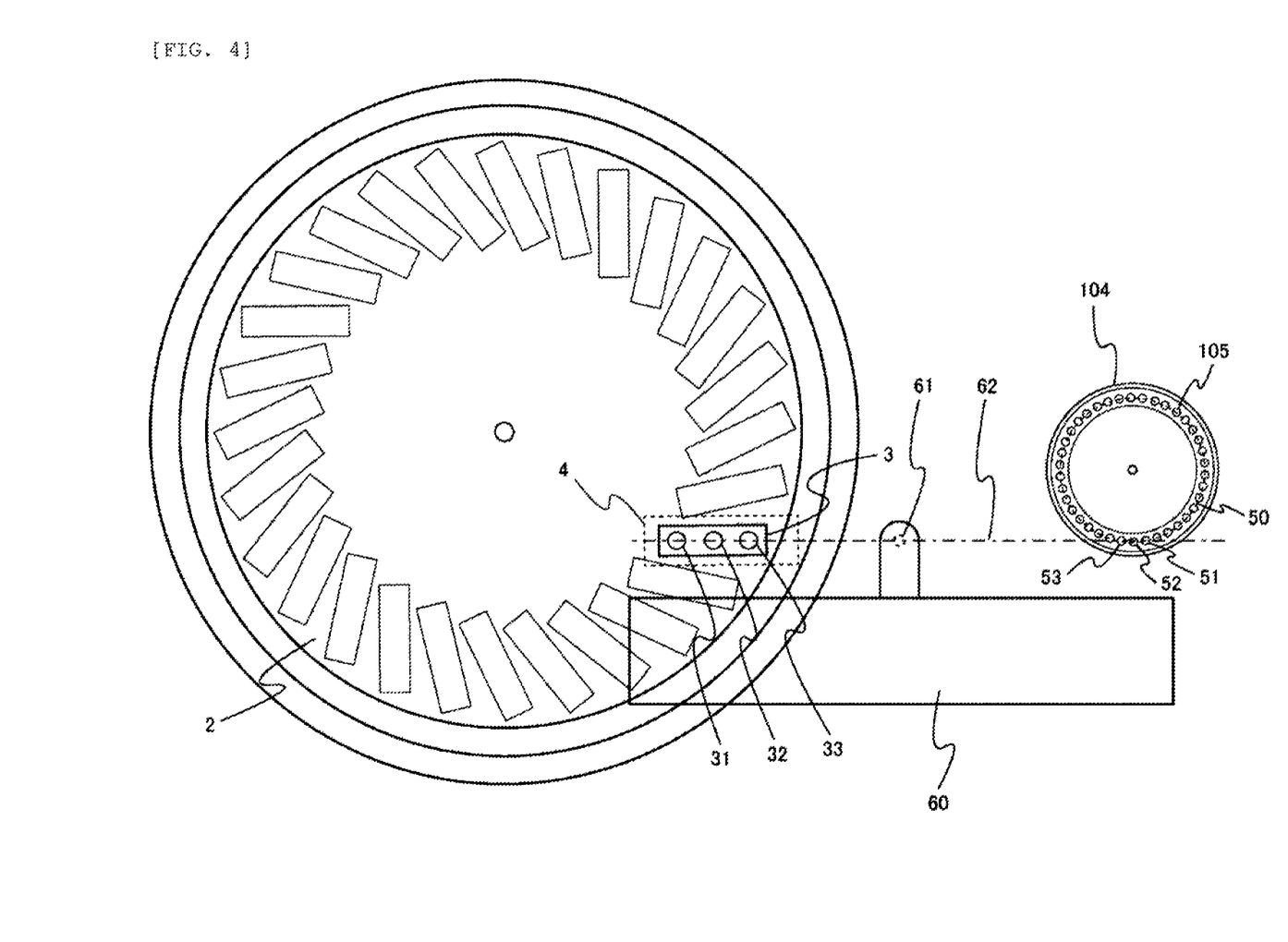
FIG. 4 is a view showing an arrangement of a reagent disk, a reagent dispensing mechanism and an incubator in a second embodiment.

A second embodiment shows an apparatus in which a mechanism that performs an operation of a linear trajectory to access a plurality of positions arranged on an arc. The second embodiment is also an example of the automatic analysis apparatus, and FIG. 4 shows main parts according to the second embodiment. FIG. 4 shows a reagent dispensing mechanism 60 that has a reagent probe 61 for sucking and discharging a reagent and performs an operation in an linear trajectory 62, the reagent disk 2 that is capable of holding a plurality of reagent bottles 3 similar to that in the first embodiment, and the incubator 104 that is capable of holding the plurality of reaction vessels 105. Although FIG. 4 shows an example in which the reagent bottle 3 is obliquely arranged on the reagent disk 2 similar to that in the first embodiment, the reagent bottle 3 may be arranged radially along the diameter of the reagent disk 2.

For a plurality of adjacent reaction vessels 105 provided on an arc 50 on the incubator 104, an example is given in which the reagent dispensing mechanism 60 continuously split-discharges one reagent sucked for a plurality of reaction vessels into a plurality of reaction vessels 105 (it is not always necessary to perform split discharging, and access to any of the plurality of reaction vessels may be performed). Specifically, the reaction vessels 105 at three adjacent positions 51, 52 and 53 on the incubator 104 are accessed by a linear operation of the reagent dispensing mechanism 60.

The position 4 on the reagent disk 2 accessed by the reagent dispensing mechanism 60 and the discharging positions 51, 52 and 53 on the incubator 104 accessed by the reagent dispensing mechanism 60 are fixed, and are in a positional relationship shown in FIG. 4. First, the reagent disk 2 rotates to move the reagent bottle 3 containing the reagent to be sucked to the position 4. The reagent dispensing mechanism 60 accesses a predetermined suction port (any one of 31, 32 and 33) of the reagent bottle 3, and sucks the reagent using the reagent probe 61. On the other hand, the incubator 104 also rotates, and the reaction vessel 105 for discharging the reagent is moved to the discharging positions 51, 52 and 53. Thereafter, the reagent dispensing mechanism 60 discharges the sucked reagent to three reaction vessels 105 positioned at the adjacent discharging positions 51, 52 and 53 while sequentially moving on the linear trajectory 62. In this case, since the discharging positions 51, 52 and 53 are positioned on the arc 50, all centers of the three positions are not possible to be placed on the linear trajectory 62. Therefore, deviations between the centers of the three discharging positions and the linear trajectory are minimized.

Figure 5:
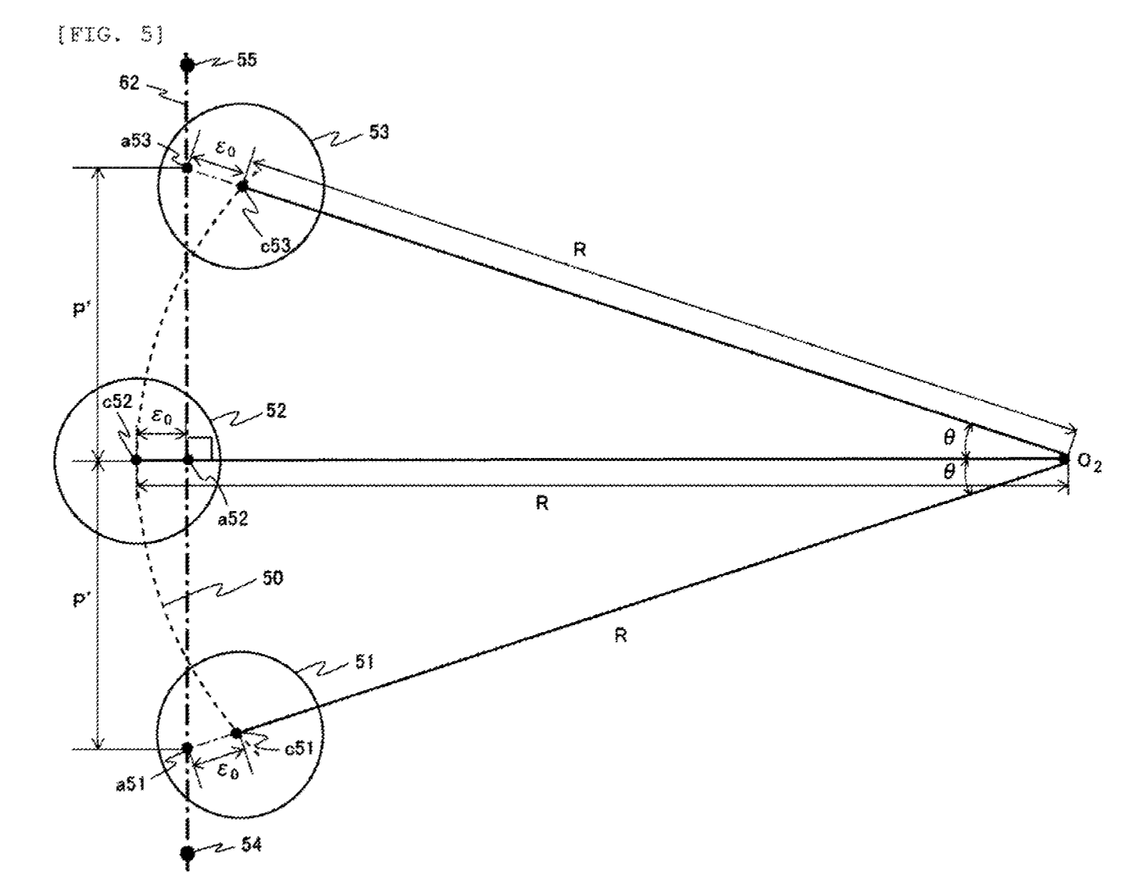
FIG. 5 is a view showing a positional relationship between a linear trajectory of the reagent dispensing mechanism and a plurality of discharging positions of the incubator.

In a way of thinking similar to that in the first embodiment, deviation amounts ε between the linear trajectory 62 of the reagent dispensing mechanism 60 and center positions c51, c52 and c53 of the three discharging positions 51, 52 and 53 on the incubator 104 are set to the same $\varepsilon_0$ to obtain a minimum deviation amount. As shown in FIG. 5, a pitch at which the reaction vessel 105 is provided on the incubator 104 is defined as θ, and a radius of the arc 50 on which the reaction vessel 105 is installed on the incubator 104 (a distance between a rotation axis $O_2$ of the incubator 104 and the discharging position (the center position of the reaction vessel 105)) is defined as R (however, the arc 50 is drawn by exaggeration in FIG. 5 for clarity). Further, since $R \gg \varepsilon_0$, a distance P' between the access positions a51, a52 and a53 of the three discharge positions 51, 52 and 53 meets $P' = (R + \varepsilon_0) \sin \theta \approx R \sin \theta$. Here, (Equation 3) is established based on the Pythagorean theorem, and (Equation 4) can be derived from transformation of (Equation 3).

$$(R\sin\theta)^2 + (R - \varepsilon_0)^2 = (R + \varepsilon_0)^2 \quad \text{(Equation 3)}$$

$$\varepsilon_0 = \frac{R \sin^2 \theta}{4} \quad \text{(Equation 4)}$$

Therefore, according to (Equation 4), in order to allow the deviation amount $\varepsilon_0$ to be as small as possible, the pitch θ may be set as small as possible, or the radius R may be set as small as possible. However, similar to that in the first embodiment, settings of the pitch θ and the radius R are somewhat limited due to a device size constraint, part fabrication, or a required amount of a reaction liquid. It is necessary to set an appropriate value since a relationship of a size of the opening of the reaction vessel 105 and a thickness of the reagent probe 61 and the like also affect a clearance at a time when the reagent dispensing mechanism 10 accesses the reaction vessel.

For example, when the radius R of the arc 50 on which the reaction vessel is provided is 58 mm and the pitch θ between the reaction vessels 105 is 9.47° (by dividing 360° equally into 38 positions), the deviation amount $\varepsilon_0$ between the linear trajectory 62 of the reagent dispensing mechanism 60 and the centers c51, c52 and c53 of the reaction vessels is 0.393 mm according to (Equation 4). When an opening size of the reaction vessel 105 is φ6 mm and the thickness of the reagent probe 61 is φ1 mm, the clearance value between the reaction vessel opening and the reagent probe is (6/2)−(1/2)−0.393=2.107 mm.

Figure 6:
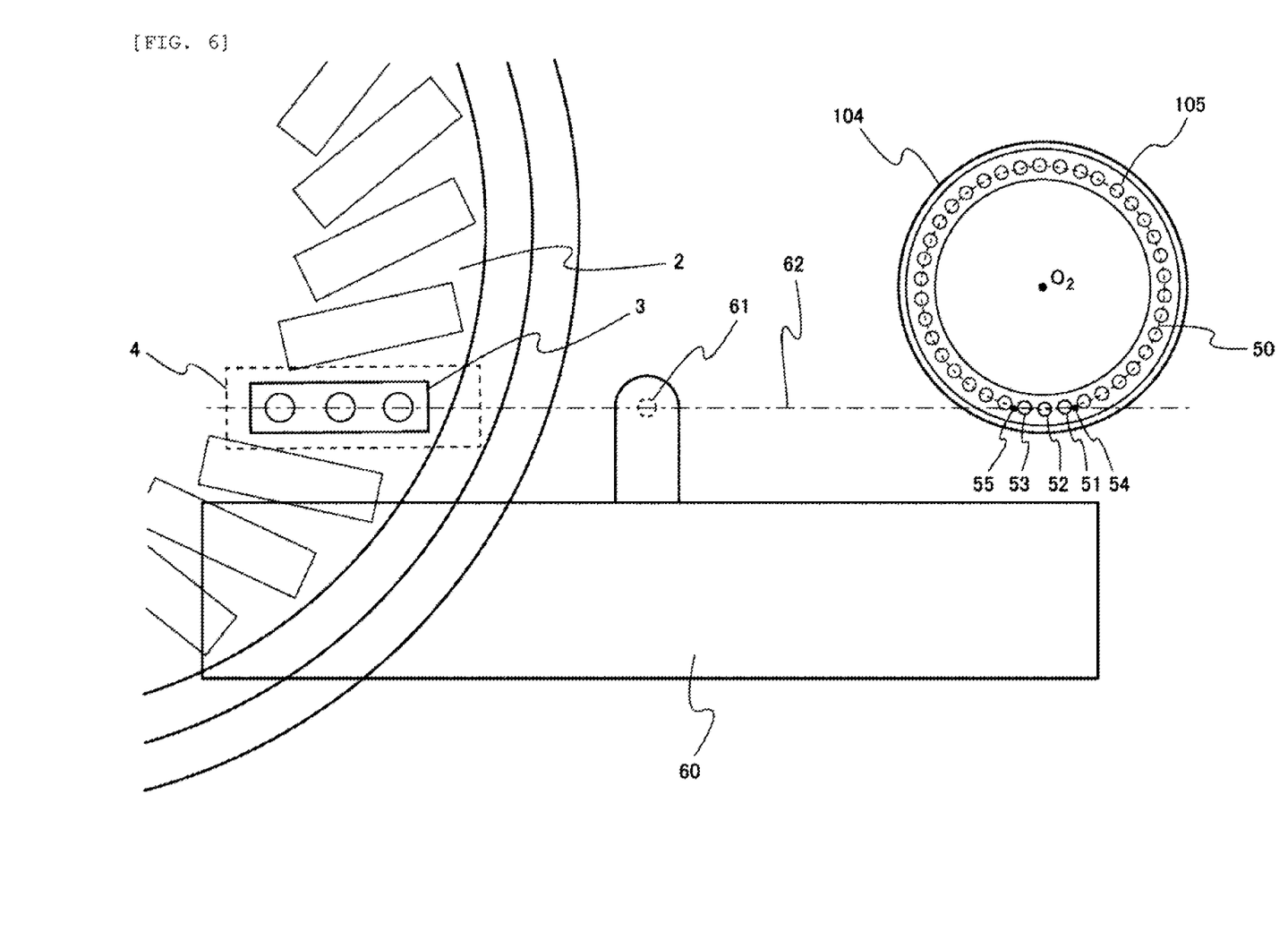
FIG. 6 is a view showing position adjustment means of the second embodiment.

The position adjustment in the second embodiment will be described. As shown in FIG. 6, on the incubator 104, marks 54 and 55 are provided on the linear trajectory 62 of the reagent dispensing mechanism 60 and in the vicinity outside both ends of the discharging positions 51, 52 and 53. One set of marks may be provided in the incubator 104. Here, the mark at a position close to the discharging position 51 is referred to as a first mark 54, and the mark at a position close to the discharging position 53 is referred to as a second mark 55. A positional relationship between the mechanisms is adjusted such that the reagent probe 61 of the reagent dispensing mechanism 60 passes through the first mark 54, the second mark 55, and the center of the reagent bottle 3 at the position 4 on the reagent disk 2. The first mark 54 and the second mark 55 are protrusions or holes. Cylindrical protrusions or holes can be accurately and easily formed on the incubator by forming a reaction vessel holding unit of the incubator 104 using a resin and by forming the protrusions or holes corresponding to the marks 54 and 55 in a mold. Positions on the incubator through which the linear trajectory of the reagent dispensing mechanism 60 passes may be indicated by printing or sealing, without being limited to protrusions or holes.

After the mechanisms are installed such that the linear trajectory 62 of the reagent dispensing mechanism 60 passes through the three positions described above, the access position of the reagent probe 61 may be a more appropriate position by adjustment by using software. Specifically, the reagent dispensing mechanism 60 moves toward an adjustment target position, and then a movement amount that indicates a correct access position is obtained and stored in the storage device of the control computer 123.

Similarly to the first embodiment, the reagent dispensing mechanism 60 linearly moves down with respect to each of the first mark 54 and the second mark 55, and a movement amount by which the reagent probe 61 comes right above the first mark 55 and the second mark 55 is obtained. As shown in FIG. 5, since a relationship between the first mark 54 and the second mark 55 and the access positions a51, a52 and a53 of the discharging position is fixed, the movement amount to the access positions a31, a32 and a33 of the discharging position can be calculated based on the movement amounts to the first mark 54 and the second mark 55.

The second embodiment has been described above by taking the reagent dispensing mechanism 60, the reagent bottle 3 arranged on the reagent disk 2, the incubator 104, and the reaction vessel 105 as an example. However, this is an example, and a mechanism that performs an operation of a wide linear trajectory is applicable to an apparatus that accesses a plurality of positions arranged on an arc.

REFERENCE SIGN LIST 1 automatic analysis apparatus
2 reagent disk
3 reagent bottle
4 region
5 discharging position
10 reagent dispensing mechanism
11 reagent probe
12 arcuate trajectory
31 first suction port
32 second suction port
33 third suction port
35, 36 mark
50 arc
51, 52, 53 discharging position
54, 55 mark
60 reagent dispensing mechanism
61 reagent probe
62 linear trajectory
101 rack
102 sample vessel
103 sample dispensing mechanism
104 incubator
105 reaction vessel
106 transport mechanism
107 holding member
108 stirring mechanism
109 disposal hole
110 sample dispensing tip mounting position
115 magnetic particle stirring device 116 reaction vessel transport mechanism
117 detection unit
118 rack transport line
120 rack transport unit
121 power supply instruction unit
122 power off instruction unit
123 control computer
301 suction port
302 lid
303 shoulder
304 protrusion
305 hinge
306 sealing member

The invention claimed is:

1. An automatic analysis apparatus, comprising:
a reagent disk which has a disk shape and accommodates a plurality of reagent bottles, each of which has a rectangular parallelepiped shape and in each of which a plurality of suction ports are arranged along a center line, and which rotates around a central axis in a circumferential direction to transport a reagent bottle to a desired position; and
a reagent dispensing mechanism which rotates around a rotation axis to suck a reagent from the reagent bottle at a predetermined suction position on the reagent disk, wherein
a first mark and a second mark, including protrusions or holes, are disposed on a surface of the reagent disk, the first mark and the second mark being arranged separate from the reagent bottle and next to at least one mounting position of the reagent bottle on the surface of the reagent disk, the first and second marks sandwiching the mounting position of the reagent bottle,
the reagent dispensing mechanism is arranged such that an arcuate trajectory of the reagent dispensing mechanism passes above the first and second marks,
the reagent dispensing mechanism accesses any one of the plurality of suction ports of the reagent bottle transported to the predetermined suction position by the rotation of the reagent disk to perform reagent suction,
an incubator which rotates around a rotation axis and is provided with a plurality of reaction vessels mounted thereon, and
a control computer, wherein
the reagent dispensing mechanism is further arranged such that the arcuate trajectory of the reagent dispensing mechanism passes through a discharging position of the incubator, and discharges a reagent to a reaction vessel at the discharging position on the incubator,
the control computer stores a rotational movement amount of the reagent dispensing mechanism to the first and second marks in a storage device thereof, and
a rotational movement amount to any one of the plurality of suction ports of the reagent bottle, to which the reagent dispensing mechanism accesses, transported to the predetermined suction position is determined based on the rotational movement amount of the reagent dispensing mechanism to the first and the second marks.

2. The automatic analysis apparatus according to claim 1, wherein
the reagent bottle is accommodated in the reagent disk such that an angle between the center line of the plurality of suction ports and a line extending radially outward from a center of the reagent disk through a center of the reagent bottle is greater than zero.

* * * * *